US005139695A

United States Patent [19]

Eckhardt

[11] Patent Number: 5,139,695

[45] Date of Patent: Aug. 18, 1992

[54] STABLE BLEACHING COMPOSITIONS CONTAINING FLUORESCENT WHITENING AGENTS

[75] Inventor: Claude Eckhardt, Riedisheim, France

[73] Assignee: Ciba-Geigy Corporation, Ardsley, N.Y.

[21] Appl. No.: 678,164

[22] Filed: Mar. 28, 1991

Related U.S. Application Data

[63] Continuation of Ser. No. 294,027, Jan. 6, 1989, abandoned.

[30] Foreign Application Priority Data

Jan. 14, 1988 [CH] Switzerland ........................ 124/88

[51] Int. Cl.[5] ........................................ C01B 11/06

[52] U.S. Cl. ........................ 252/187.24; 252/187.25; 252/95

[58] Field of Search .................... 252/187.24, 187.25, 252/95, 103

[56] References Cited

U.S. PATENT DOCUMENTS

| | | | |
|---|---|---|---|
| 3,393,153 | 7/1968 | Zimmerer et al. | 252/95 |
| 3,655,566 | 4/1972 | Robinson et al. | 252/187.24 |
| 4,002,423 | 1/1977 | Sahm et al. | 8/1 W |
| 4,028,263 | 6/1977 | Gray | 252/103 |
| 4,235,732 | 11/1980 | Beyer | 252/187.24 |
| 4,457,855 | 7/1984 | Sudbury et al. | 252/187.24 |
| 4,474,677 | 10/1984 | Foxlee | 252/187.24 |
| 4,552,680 | 11/1985 | Hartman et al. | 252/187.24 |

OTHER PUBLICATIONS

Kirk-Othmer Encyclopedia of Chem. Technology 3rd ed. vol. 3, pp. 554-555, 940-943, John Wiley & Sons, N.Y.

*Primary Examiner*—Robert L. Stoll
*Assistant Examiner*—Joseph D. Anthony
*Attorney, Agent, or Firm*—Marla J. Mathias; George R. Dohmann

[57] ABSTRACT

The present invention relates to a stable aqueous hypochlorite solution which contains at least one specific fluroescent whitening agent of the bis(benzofuranyl) type, to the preparation thereof, and to the use of said composition for simultaneously bleaching and whitening materials in the home and in industry. These bleach solutions are stable for several months.

7 Claims, No Drawings

STABLE BLEACHING COMPOSITIONS CONTAINING FLUORESCENT WHITENING AGENTS

This is a continuation of application Ser. No. 294,027, filed Jan. 6, 1989, now abandoned.

The present invention relates to a stable aqueous hypochlorite solution which contains at least one specific fluorescent whitening agent of the bis(benzofuranyl) type, to the preparation thereof, and to the use of said composition for simultaneously bleaching and whitening materials in the home and in industry.

Concentrated hypochlorite solutions and formulations have long been known. They are used, for example, alone or in conjunction with detergents or soaps for washing and bleaching household laundry. The hypochlorite solution, however, has a strong tendency to oxidise and destroy the customary fluorescent whitening agents present, for example, in detergent compositions.

The only fluorescent whitening agent known at present to have a certain stability for a short time to concentrated hypochlorite solution is disclosed in European patent application A-O 142 883 and in U.S. Pat. No. 4 623 476. This fluorescent whitening agent is, however, not suitable for preparing a storage-stable bleach solution or formulation, as a marked decomposition of the fluorescent whitening agent can be observed even after a few days. In addition, this fluorescent whitening agent is not soluble in aqueous hypochlorite and is thus present only in the form of a dispersion. This feature may, in turn, result in precipitation of the fluorescent whitening agent and in fluctuating concentrations.

Surprisingly, it has now been found that special bis(-benzofuranyl) compounds exhibit excellent stability to concentrated hypochlorite solution. These special bis(-benzofuranyl) compounds produce good white effects and, under average storage conditions (temperatures up to 30° C.), are stable for several months in aqueous hypochlorite solution or, at most, are decomposed to a degree that does not affect their use in practice.

Accordingly, the present invention relates to aqueous bleach solutions comprising 2 to 10% of water-soluble hypochlorite and 0.025 to 0.5% of a fluorescent whitening agent, based on the entire bleach solution, wherein the fluorescent whitening agent is a bis(benzofuranyl) compound of formula I

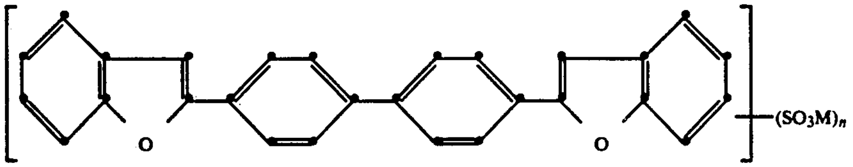

(I)

wherein

M is hydrogen or an equivalent of a non-chromophoric cation, and n is 2 to 4, and wherein the compound (I) may also be substituted by radicals R selected from the group consisting of halogen, $C_1$–$C_4$alkyl and $C_1$–$C_4$alkoxy.

M in formula I is, for example, an alkaline earth metal such as magnesium or calcium, but is preferably an alkali metal such as lithium, sodium, potassium or unsubstituted or substituted ammonium such as ammonium, mono-, di- or triethanolammonium, mono-, di- or tripropanolammonium or tri- or tetramethylammonium.

The bleach solutions of this invention preferably contain a fluorescent whitening agent of formula

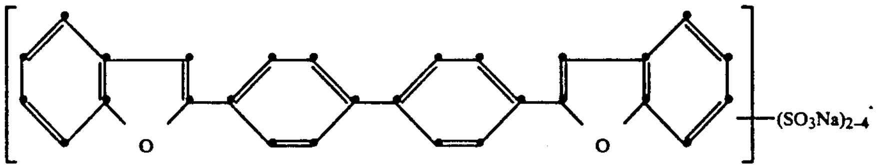

(II)

These fluorescent whitening agents of formulae I and II are known and can be prepared by known methods (see DE-OS 2 238 743).

The bleach solution preferably contains 4 to 6% of hypochlorite, based on the entire bleach solution, the hypochlorite being conveniently in the form of the calcium, potassium and/or sodium salt.

The amount of fluorescent whitening agent is preferably from 0.05 to 0.1%, based on the entire bleach solution.

In addition to containing water, hypochlorite and fluorescent whitening agent, the bleach solution may also contain 0.01 to 10%, based on the entire bleach solution, of auxiliaries that are stable to hypochlorite, for example pigments, dyes, buffer substances such as carbonates, silicates, orthophosphates and tetraborates, perfume and, in particular, surfactants such as alkylaryl sulfonates containing 8 to 20 carbon atoms and, preferably, linear alkylbenzenesulfonates containing 10 to 13 carbon atoms in the alkyl chain.

The bleach solution is prepared by a) mixing water, preferably deionised water, fluorescent whitening agent and further optional auxiliaries, and b) adding the hypochlorite to the stirred solution.

The solution is used for simultaneously bleaching and whitening textile fabrics made from natural and/or synthetic materials such as cellulose, polyamide and polyester.

The invention is illustrated by the following non-limitative Example, in which percentages are by weight.

EXAMPLE

A formulation comprising 0.25% of linear sodium alkylbenzenesulfonate of 10 to 13 carbon atoms, 45% of NaOCl (13% aqueous solution), 0.07% of the fluorescent whitening agent of formula II or III (according to EP-A 142 883),

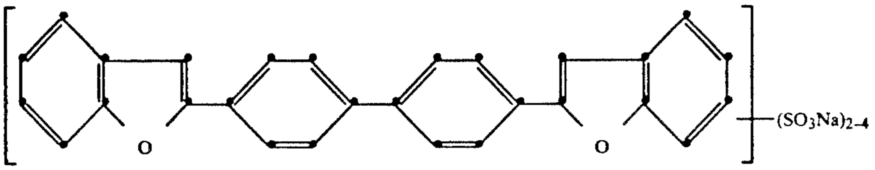

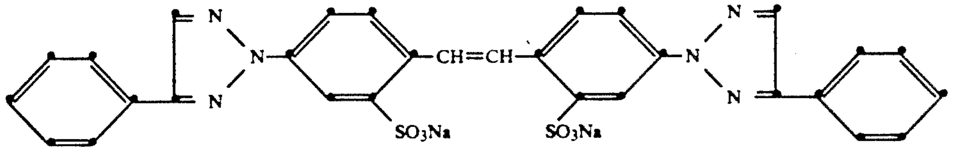

(III)

remainder water and NaOH until pH 12.2 is stored for 14 days at room temperature. After neutralising the chlorine with sodium bisulfite, the content of fluorescent whitening agent is determined by spectrophotometry immediately after preparation and also after storage.

After storage for 14 days, the content of fluorescent whitening agent of formula II is 90%, based on an initial value of 100%.

By comparison, the content of fluorescent whitening agent of formula III after storage for 14 days is only 23%, based on an initial value of 100%.

What is claimed is:

1. A stable aqueous bleach solution consisting essentially of (a) 2 to 10% of water-soluble hypochlorite, (b) 0.025 to 0.5% of at least one fluorescent whitening agent, wherein the fluorescent whitening agent is a bis(benzofuranyl) compound of formula I (I)

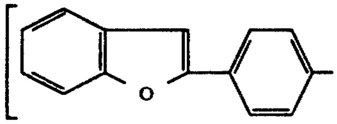

-continued

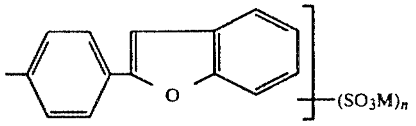

(II)

wherein n is 2 to 4, M is hydrogen or an equivalent of a non-chromophoric cation, and wherein the compound of formula I is unsubstituted or substituted by one or more substituents selected from the group consisting of halogen, $C_1$-$C_4$alkyl and $C_1$-$C_4$alkoxy, the fluorescent whitening agent being present in the bleach solution in the absence of additional stabilizing means, and (c) 0 to 10% of an auxiliary; the percentages being based on the entire bleach solution.

2. A bleach solution according to claim 1, wherein the fluorescent whitening agents are compounds of formula (II)

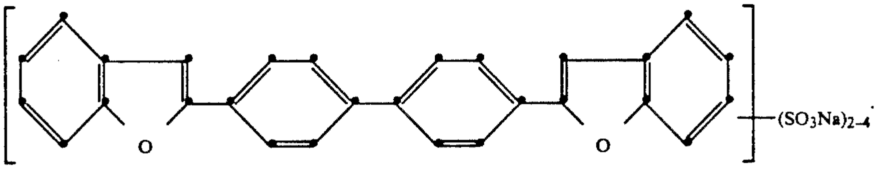

3. A bleach solution according to claim 1 which contains 4 to 6% of sodium hypochlorite, based on the entire bleach solution.

4. A bleach solution according to claim 1, which contains 0.05 to 0.1% of the fluorescent whitening agent, based on the entire bleach solution.

5. A bleach solution of claim 1 which contains 0.01 to 10% of the auxiliary, the auxiliary being stable to hypochlorite and selected from the group consisting of pigments, dyes, buffer substances, perfumes, surfactants and mixtures thereof.

6. A process for simultaneously whitening and bleaching a textile fabric which comprises treating the textile fabric with a bleach solution as claimed in claim 1.

7. A process of claim 6 wherein the textile fabric is cellulose, polyamide or polyester.

* * * * *